United States Patent [19]
LaBounty

[11] Patent Number: 4,984,270
[45] Date of Patent: Jan. 8, 1991

[54] METHOD AND SYSTEM FOR TRANSMISSION OF FINANCIAL DATA
[75] Inventor: Jack LaBounty, Bellevue, Wash.
[73] Assignee: The Exchange System, Bellevue, Wash.
[21] Appl. No.: 64,169
[22] Filed: Jun. 19, 1987
[51] Int. Cl.⁵ .............................................. H04K 1/00
[52] U.S. Cl. ........................................ 380/24; 380/23; 380/25; 380/43
[58] Field of Search ....................... 380/24, 23, 25, 43
[56] References Cited
U.S. PATENT DOCUMENTS
4,317,957  3/1982  Sendrow ................................. 380/24
4,423,287  12/1983  Zeidler ................................... 380/24
4,578,530  3/1986  Zeidler ................................... 380/24

Primary Examiner—Thomas H. Tarcza
Assistant Examiner—David Cain
Attorney, Agent, or Firm—Seed and Berry

[57] ABSTRACT

An improved system for transmission financial data includes, in preferred embodiments, an encryption key stored on a bank card and used to encrypt preselected data prior to transmission. Encrypted data is then transmitted through all intermediate computers without decryption and reencryption. Decryption occurs only at the final destination, where the encryption key has been stored. In preferred embodiments, the encryption key is combined with a terminal identification valve to provide further security.

5 Claims, 2 Drawing Sheets

METHOD AND SYSTEM FOR TRANSMISSION OF FINANCIAL DATA

TECHNICAL FIELD

This invention relates to financial transaction methods and systems, more particularly to an improved method and system for encrypting electronic data for secure transmission during financial transactions.

BACKGROUND ART

When sensitive data relating to financial transactions is transmitted or stored in electronic form, it is often desirable to secure the data in some manner. In electronic funds transfers, debits or credits, security is presently accomplished by encrypting sensitive portions of the data using a data encryption algorithm known as the Data Encryption Standard, or DES. DES was formally adopted by the United States National Bureau of Standards in 1983 and is described in Federal Information Processing Standards Publication FIBS PUB 46 dated Jan. 15, 1977, which is hereby incorporated by reference. DES operates using a 64 bit key that is used to encrypt and decrypt data.

In modern financial transactions, customers use point of service machines, such as automatic teller machines (ATMs) or point of sale (POS) terminals, to conduct financial transactions at locations remote from the customer's bank or other financial institution. Data relating to such transactions must be transferred electronically to the customer's financial institution to verify and record the transaction. Data is typically transmitted back to the ATM or POS terminal to authorize or deny the transaction.

To enable an ATM or POS transaction, a customer is typically issued a financial transaction identification card, or bank card, and a corresponding personal identification number (PIN) by the customer's financial institution. The bank card includes at least one magnetic stripe on which information relating to the customer and issuing institution is stored. To conduct a transaction, the ATM or POS terminal must read preselected information from the magnetic stripe and transmit it to the issuing institution along with the customer's PIN which is entered by the customer at the time of the transaction. The PIN is designed to act as a primary security measure as it is necessary to have the bank card and know the PIN in order to complete a transaction.

Because of the sensitive nature of the data transmitted back and forth during an ATM or POS transaction, at least some of the data is normally encrypted using DES to reduce the risk of interception and compromise. At present, this is accomplished by encrypting the PIN, for example, using a DES key secured within the POS terminal. The DES key itself is often encrypted using additional DES keys to provide further layers of security, and keys are preferably stored in secure hardware devices to avoid compromise. Encrypted data from a POS terminal will then be transmitted to a computer controlling a number of POS terminals where the appropriate DES keys are stored and the data will be decrypted.

In order to arrive at issuing institution's computer to verify and record the transaction, the data will normally be transmitted through a chain of multiple computers, with data encryption and decryption occurring at each node or link in the chain. Each encryption and decryption operation introduces expense in associated hardware needs and ongoing security measures to maintain and periodically change DES keys. Decryption and reencryption at numerous intermediate locations also results in multiple periods during the transmission when the data is not secure. Further, multiple encryption and decryption operations slow down data transmission, an especially undesirable result in a POS environment where merchants want minimum delays in processing customer transactions. As such, the current methods and systems for securing electronic data in financial transactions are undesirable in that they are relatively expensive, leave the data unsecured at various times during transmission, and introduce delays into the transmission process.

Existing documents describing known data encryption techniques and financial institution standards include the following which are hereby incorporated by reference:

Reference documents from International Organization for Standardization:
(1) ISO 7811/2, Identification cards - Recording technique - Part 2: Magnetic stripe.
(2) ISO 7813, Identification cards - Financial transaction cards.
(3) ISO TC68/SC2 Working draft N177 and N178, Banking - Personal Identification Number Management and Security - Part 1: PIN protection principles and technique.
(4) ISO 4909, Bank Cards - Magnetic stripe data content for track 3.

Reference documents from American National Standards Committee, X9-Financial Services:
(1) ANSI X3.92 Data Encryption Algorithm (DEA
(2) ANSI X9.8, American National Standard for PIN Management and Security.
(3) ANSI X9.19, Financial Institution Retail Message Authentication.
(4) ANSI X9.24, Draft 5.0, Financial services - Retail Key Management.

Reference documents from U.S. Department of Commerce/National Bureau of Standards:
(1) FIPS PUB 46, Federal Information Processing Standards publication - Data Encryption Standard.

DISCLOSURE OF THE INVENTION

It is an object of the present invention to provide an improved method and system for securing electronic data for financial transactions or the like.

It is another object of the invention to provide such a method and system that will not require extensive security hardware.

It is another object of the invention to provide such a method and system that will keep data secure throughout transmission of the data.

It is another object of the invention to provide such a method and system that will minimize delays in the transmission process.

These and other objects of the invention, which will become more apparent as the invention is more fully described below, are obtained by providing an improved method and system for encrypting data for financial transactions or the like. In preferred embodiments of the invention, an encryption key is stored on a bank card and used to encrypt preselected data prior to transmission. Encrypted data is then transmitted through all intermediate computers without decryption and reencryption. Decryption occurs only at the final destination, where the encryption key has been stored. In preferred embodiments, the encryption key is combined with a terminal identification valve to provide further security.

BEST MODE FOR CARRYING OUT THE INVENTION

In preferred embodiments, the present invention operates by assigning each financial institution or each financial transaction identification card an Issuer Security Key comprising a 4 to 64 bit value to be used as all or part of an encryption key to the Data Encryption Algorithm (DEA) implemented by the DES. The Issuer Security Key is encoded on one or all magnetic stripe tracks on a financial institution identification card. The value recorded on the card is also retained by the card issuing financial institution. When the card is used in a point-of-service device, the encoded Issuer Security Key is used to encrypt data such as the cardholder-entered Personal Identification Number (PIN), for communication transmission from the point-of-service device to the card issuer, or it agent, for decryption.

Figure 1:
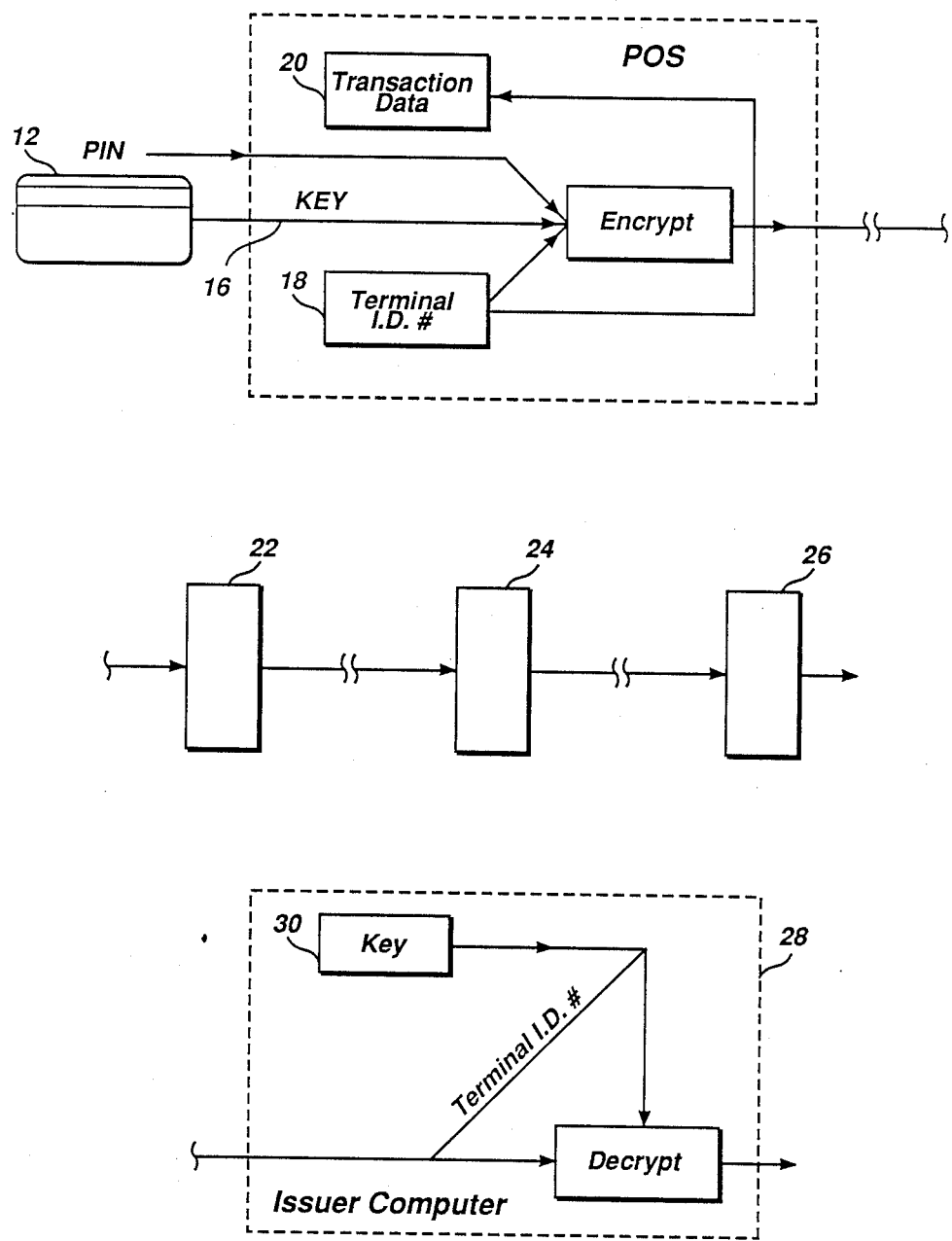
FIG. 1 is a schematic diagram illustrating the operation of a preferred embodiment of the present invention.
Figure 2:
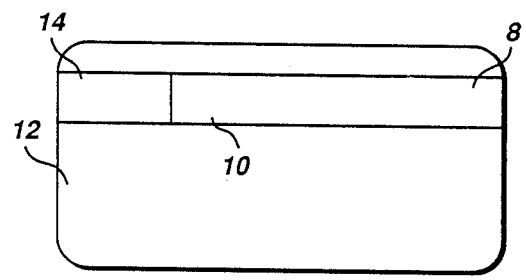
FIG. 2 is a plan view of a financial transaction identification card illustrating the location where the DES key is preferably encoded in accordance with a preferred embodiment of the present invention.

A schematic illustration of the preferred embodiment of the present invention, implemented on a point-of-sale (POS) terminal is illustrated in FIG. 1. A customer (not shown) presents a financial transaction identification card 12 to the POS terminal which reads information, including the issuer security key 16, from the card. The customer or merchant enters information about the transaction into the POS. The POS terminal, preferably logically exclusive, OR's the key value with a terminal identification number to produce a 64-bit DEA encryption key. If necessary, the least significant bits are assembled as necessary to produce a 64-bit key. The DEA key is used to encrypt the customer's PIN 18 and the encrypted PIN is transmitted along with other transaction data 20 including the terminal identification number. The transaction data and encrypted PIN are transmitted through intermediate computers or nodes 22, 24 26 until arrival at the issuer's computer 28. At the issuer's computer, the encrypted PIN is decrypted using the key 30 stored at the issuer's computer and the terminal identification number included in the transaction data.

The issuing financial institution may select a single Issuer Security Key for all customers, multiple Issue Security Keys shared by groups of customers, or unique Issue Security Keys for each customer, depending on the security needs of the issuing institution.

Using known DEA key security practices, the Issuer Security Key retained by the card issuer is secured from easy disclosure. This may be accomplished by storing the Issuer Security Key as a cryptogram by encrypting it under the D(A using an issuer master key retained in a hardware security unit, such as those currently available from ATTLA of San Jose, Calif. and Quadstar of Dallas, Tex. The method used to secure the Issuer Security Key at the card issuer's site is selected at the card issuer's discretion, since the liability and risk of compromise is with the card-issuing organization.

The Issuer Security Key is recorded in the clear (i.e., in unencrypted form) on a magnetic stripe encoded track of the financial transaction identification card. The actual risk of exposure is no greater than the use of key management systems as described in ANSI X9.19 and ANSI X9.24. This is true since the compromise of the Issuer Security Key requires having the actual financial transaction identification card with the key recorded on it. Fraud can only take place if the actual card is obtained which exposes only that card. Under other key management systems, the compromise of a DEA encryption key can expose all financial transaction identification cards and related secured data (e.g. a cardholder-entered personal Identification Number) processed under that key before a new key can be established.

Also, the financial transaction identification card exposure of the Issuer Security Key has no direct relationship with the data being secured under a DEA process using this key. If the key was compromised by fraudulently obtaining the card, the related cardholder Personal Identification Code (PIN), for example, could not be derived. PIN disclosure could only be obtained from the cardholder who obtained the PIN from the card issuer or established the PIN with the card issuer.

Application of the Issuer Security Key for use as an encryption and decryption DEA key eliminates the need for DEA key management systems between each node in a communications network supporting financial transaction identification cards. This eliminates cost and processing overhead to support related hardware security units, related application security software and personnel procedures in creating and storing keys or key parts in the implementation and maintenance of a DEA key management system.

MAGNETIC STRIPE RECORDING TECHNIQUE

The Issuer Security Key is a series of 4-bit characters encoded on a magnetic stripe 8, such as either Track 1, Track 2 or Track 3, or encoded on any combination of the tracks in a key region 14 following the track's Longitudinal Redundancy Check (LRC) character 10 on a financial transaction identification card 12. The key region is currently unused, or used only for clock bits as described below. Each 4-bit character can be any of the following values:

| 4-Bit Series | Hexadecimal Character | 4-Bit Series | Hexadecimal Character |
| --- | --- | --- | --- |
| 0000 | 0 | 1000 | 8 |
| 0001 | 1 | 1001 | 9 |
| 0010 | 2 | 1010 | A |
| 0011 | 3 | 1011 | B |
| 0100 | 4 | 1100 | C |
| 0101 | 5 | 1101 | D |
| 0110 | 6 | 1110 | E |
| 0111 | 7 | 1111 | F |

The Issuer Security Key may be any length from a minimum of one character (4 bits) to a maximum length of sixteen characters (64 bits).

Each of the three magnetic stripe tracks has a different combination of coded character set and bit recording density per the ISO 7811/2 standard. According to ISO 7811/2, each track has the minimum physical encoding length requirement of 2.957 inches (magnetic stripe length). All encoding discussions in this document will consider the maximum encoding length capability of any specific track to be the 2.957 inches.

Each track's encoding capabilities to support the Issuer Security Key is described in the following clauses.

TRACK 1 ISSUER SECURITY KEY ENCODING

Track 1 uses a code character set of 6 bits per character plus a parity bit as defined in ISO 7811/2. The Issuer Security Key character set shall be composed of the characters from Column 0, Rows 0-15 as defined in ISO 7811/2 for the Track 1 character set and shall use odd parity.

Given the Track 1 recording structure as defined in ISO 7813, the maximum number of encoded characters shall not exceed 79 characters including the LRC character. This provides, at a minimum, the recording capability for an Issuer Security Key of 9 characters (36 bits).

Issuers wishing to record 16 characters (64 bits) for the Issuer Security Key shall only encode a maximum of 74 characters for the Track 1 recorded structure. The shorter encoding length of Track is well within the issuer's options of recording Track 1 information per the ISO 7813 standard.

Calculations used in determining the Issuer Security Key recording capability per ISO 7811/2 and ISO 7813:

Total Track 1 physical recording capacity; (2.957 inches available)×(210 bits per inch recording density)=620.97 bit positions.

Track 1 physical recording capacity after the LRC character given the maximum Track 1 recording structure as defined in ISO 7813; (79 characters)×(6-bit code character set+1 parity bit) 553 bit positions encoded. 620.97−553=67.97 bit positions are then available after the last LRC character encoded bit.

Therefore, the minimum always available for the Issuer Security Key is 67.97÷7=9.71 characters (actually 9 whole characters). Since only the lower order four bits of the six-bit character set are used for the Issuer Security Key, (4 bits)×(9 characters) =36, 36 total bits are available for the Issuer Security Key value.

TRACK 2 ISSUER SECURITY KEY ENCODING

Track 2 uses a code character set of 4 bits per character plus a parity bit as defined in ISO 7811/2. The Issuer Security Key character set shall be composed of the 4-bit characters from Rows 0 through 15 as defined in ISO 7811/2 for the Track 2 character set and shall use odd parity.

Given the Track 2 recording structure as defined in ISO 7813, the maximum number of encoded characters shall not exceed 40 characters including the LRC character. This provides at a minimum, the recording capability for an Issuer Security Key of 4 characters (16 bits).

Issuers wishing to record 16 characters (64 bits) for the Issuer Security Key shall only encode a maximum of 28 characters for the Track 2 recorded structure. The shorter encoding length of Track 2 is well within the issuer's options of recording Track 2 information per the ISO 7813 standard.

| | |
|---|---|
| Start sentinel | 1 |
| Primary Account Number | 16 |
| Separator | 1 |
| Expiration date | 4 |
| Interchange designator | 1 |
| *-continued* | |
| Service code | 2 |
| Discretionary data | 1 |
| End sentinel | 1 |
| LRC | 1 |
| Recorded Length | 28 Characters |

Calculations used in determining the Issuer Security Key recording capability per ISO 7811/2 and ISO 7813:

Total Track 2 physical recording capacity; (2.957 inches available)×(75 bits per inch recording density=221.77 bit positions.

Track 2 physical recording capacity after the LRC character given the maximum Track 2 recording structure as defined in ISO 7813; (40 characters)×(4 bit code character set+1 parity bit)=200 bit positions encoded. 221.77−200=21.77 bit positions are available after the last encoded LRC character Therefore, the minimum always available for the Issuer Security Key is 21.77÷5 =4.354 characters. Since only the lower order four bits of the character set are used for the Issuer Security Key, (4 bits)×(4 characters)=16, 16 total bits are available for Issuer Security Key value.

TRACK 3 ISSUER SECURITY KEY ENCODING

Track 3 uses a code character set of 4 bits per character plus a parity bit as defined in ISO 7811/2. The Issuer Security Key character set shall be composed of the 4 bit characters from Rows 0 through 15 as defined in ISO 7811/2 for the Track 3 character set and shall be odd parity.

Given the Track 3 recording structure as defined in ISO 4909, the maximum number of encoded characters shall not exceed 107 characters including the LRC character. This provides at a minimum the recording capability for an Issuer Security Key of 16 characters (64 bits).

Calculations used in determining the Issuer Security Key recording capability per ISO 7811/2 and ISO 4909:

Total Track 3 physical recording capacity; (2.957 inches available)×(210 bits per inch recording density)=620.97 bit positions.

Track 3 physical recording capacity after the LRC character given the maximum Track 3 recording structure as defined in ISO 4909; (107 characters)×(4 bit code character set+1 parity bit)=535 bit positions encoded. 620.97−535=85.97 bit positions are then available after the last encoded LRC character encoded bit.

Therefore, the minimum always available for the Issuer Security Key is 85.97÷5=17.194 characters.

Since only the lower order four bits of the character set are used for the Issuer Security Key, (4 bits)×(16 characters)=64, 64 total bits are available for the Issuer Security Key value.

READING THE MAGNETIC STRIPE ENCODED ISSUER SECURITY KEY

Since the Issuer Security Key is after the Longitudinal Redundancy Check (LRC) character, and may vary in encoded length, the following procedure, or any similar magnetic stripe reading process, may be used to read the encoded Issuer Security Key.

According to ISO 7811/2, clocking bits (zeros) shall be recorded on a magnetic stripe from the last recorded bit for the LRC character to the end of the magnetic stripe. Therefore, the end of the Issuer Security Key can be found by searching for the cocking bits.

Since the clocking bits are all zeros including the parity bit position, the Issuer Security Key can support the character value of 0 (where b1-b4 are 0000) since the parity bit shall be set to 1 to maintain odd parity.

To ensure the Issuer Security Key has been read successfully, and since no LRC character is encoded after the last encoded Issuer Security Key character, the parity bit position of each Issuer Security Key character shall be tested for odd parity. This maintains the character recording method as defined for all tracks in ISO 7811/2. An Issuer Security Key character read error from the financial transaction identification card on an odd parity bit test failure shall cause the Issuer Security Key to not be used in any DEA encryption process by the point-of-service device. This will cause the DEA encryption process to use a DEA key of all pad characters as described in the following clause.

ISSUER SECURITY KEY USE

To use the Issuer Security Key as a DEA key as defined in the ANSI X3.92 and FIPS PUB 46 standards, the Issuer Security Key must be expanded to a 64-bit form. To perform this process, the Issue Security Key read from the financial transaction identification card shall be left justified in a 64-bit block and padded to the right with all one (1) bits to complete the 64-bit block. Odd parity adjustment is then made before using the key in a DEA process. Odd parity is established by setting the parity of every 8-bit byte in a left to right pattern to odd (for example, 1111 1111 shall be set to 1111 1110).

The padding of the 1 bits to complete the 64-bit block is used since an odd number of 4-bit Issuer Security Key characters can be recorded on the financial transaction identification card. Normally DEA keys are represented in the 64-bit form as sixteen hexadecimal characters (0, 1-9, and A, B - F) with a space between every pair of characters. Example: 1F 2A 3D 49 5E 6B 7C 8F. Given an Issuer Security Key recorded as 81 54 BE 1 (seven 4-bit characters) on the financial transaction identification card, its value will be 8A 54BE 1F FF FF FF FF after the padding process. After the odd parity adjustment the key used by the DEA process shall be 8A 54 BF 1F FE FE FE FE.

The most ideal Issuer Security Key recorded on the financial transaction identification card by the card issuer is a complete 64-bit key already adjusted to odd parity.

Since the encrypted result of a DEA process using the Issuer Security Key will always be the same at any point-of-service device for the same DEA input block, implementations of the Issuer Security Key may include another data element exclusive OR'd to the key before use by the Data Encryption Algorithm. Whatever other data is selected, it must be available to the card issuer, or its agent, for recreating the DEA key used by the point-of-service device. An example would be a terminal identification number. The terminal identification number is then sent from the point-of-service device to the card issuer in the clear as part of a message. Given the encrypted DEA results in the same message as the terminal identification number, the Issuer Security Key is still not easily obtainable. Even if the input block was a cardholder-entered PIN and the PIN was known and the terminal identifier was known, the Issuer Security Key could still only be attacked by repetition of all possible 64-bit key combinations until a match of the DEA encryption process results is found. This makes fraud in the communications environment between the point-of-service device and the card issuer difficult with the reward of knowing only the Issuer Security Key for one financial transaction identification card. Other DEA key management systems in place may disclose all cardholder-entered PINs for all financial transaction identification cards used at a point-of-service device when the key is compromised. Also, no greater protection of the DEA key is provided by other DEA key management systems since all combinations of the 64-bit key must be attempted until a match is found.

ISSUER SECURITY KEY EXAMPLE

The most typical use of the Issuer Security key will be to secure the cardholder-entered Personal Identification number (PIN) at a point-of-service device which also reads a financial transaction identification card magnetic stripe. The PIN can then be sent in an encrypted form end-to-end from the point-of-service device to the card issuer, or its agent, for PIN verification processing. The following flow describes an implementation of this use:

| Place of Process | Description |
| --- | --- |
| Card Issuer | 1. Card issuer manufactures a financial transaction identification card and encodes an Issuer Security Key on Tracks 1 and 2. |
| Card Issuer | 2. The card issuer stores the Issuer Security Key on a Primary Account File for the Primary Account Number recorded on the card. |
| Card Issuer | 3. Before storing the Issuer Security Key, the card issuer creates a cryptogram for actual storage. The cryptogram is created by using the Data Encryption Algorithm encrypt function usng the issuer Security Key as the input block and an issuer masterkey for the DEA key. |
| Card Issuer | 4. To ensure security, the card issuer performs the cryptogram process in a hardware security module to protect the issuer's master key and not compromise the Issuer Security Key within the card issuer's facility. |
| Card Issuer | 5. The most ideal situation would be a hardware security module that randomly creates Issuer Security Keys and provides the clear Issuer Security Key directly to the card manufacturing process and creates the key cryptogram for file storage. |
| Card Issuer | 6. As part of the card manufacturing process, the card issuer also creates a Personal Identification Number (PIN) to be used with the card. |
| Card Issuer | 7. Through common card issuance and PIN issuance, both are supplied separately to the cardholder. |
| Point-of-Service Device | 8. The cardholder uses a point-of-service device (e.g., POS terminal) by swiping the financial transaction identification card and entering the cardholder's PIN. |
| Point-of-Service Device | 9. The magnetic stripe reader of the terminal reads Track 1 and captures the encoded Issuer Security |

| Place of Process | Description |
| --- | --- |
| | Key. |
| Point-of-Service Device | 10. The Issuer Security Key is exclusive OR'd to the terminal identification number to create a DEA key. |
| Point-of-Serivce Device | 11. The cardholder-entered PIN is exclusive OR'd to the Primary Account Number per the ANSI X9.8 and ISO TC68/SC2 working draft N177 standards procedure to create the DEA input block. |
| Point-of-Servce Device | 12. The result of the DEA encrypton process is then sent in a financial transaction request message to the card issuer for PIN validation. |
| Point-of-Service Device | 13. The terminal identification number is also sent to the card issuer in the same message in the clear. The use of the terminal identification number had been previously agreed to by the card acquirer and card issuer in a network operating rule business agreement. |
| Card Issuer | 14. The card issuer receives theencrypted PIN in the financial transaction request message. |
| Card Issuer | 15. To verify the cardholder-entered PIN, the card issuer passes the encrypted PIN, Primary Account File stored issuer Security Key cryptogram, the terminal identification number received in the request message and PIN validation data to a hardware security module for PIN validation. |
| Card Issuer | 16. The hardware security module decrypts the Issuer Security Key cryptogram and exclusive OR's the terminal identification number to the now clear key to recreate the same DEA key used by the point-of-service device. |
| Card Issuer | 17. Next, the hardware security module decrypts the received customer-entered PIN following ANSI X9.8 and ISO standard procedure to verify 1:1 to the card issuer's recalculated PIN also created in the hardware security module. |
| Card Issuer | 18. The PIN verification process can be speeded up by the card issuer if, during the card issuance process, the originally created PIN had been stored encrypted under the card issuer's master key on the Primary Account File. The entire PIN verification process is at the option of the card issuer. The card issuer could have also chosen not to use hardware security modules and perform all DEA decryption and PIN verification in a security software routine. |

From the foregoing it will be appreciated that, although specific embodiments of the invention have been described herein for purposes of illustration, various modifications may be made without deviating from the spirit and scope of the invention. Accordingly, the invention is not to be limited except as by the appended claims.

I claim:

1. A method of securing electronic data relating to a customer-initiated financial transaction or the like for transmission from a transaction location to a remote receiving location, comprising:
   issuing the customer a financial transaction identification card having an issuer security key encoded thereon, the issuer security key corresponding to the remote receiving location;
   storing the issuer security key at the remote receiving location;
   at the time of a financial transaction, reading the issuer security key at the transaction location from the financial transaction identification card;
   at the transaction location, encrypting preselected data relating to the financial transaction using an encryption algorithm and the issuer security key as the encryption key;
   transmitting data relating to the financial transaction, including the encrypted data, to the remote receiving location; and
   decrypting the encrypted data at the remote location using the issuer security key stored at the remote location.

2. The method of claim 1 wherein the financial transaction identification card is manufactured in accordance with the ISO 7811/2 and ISO 7318 standards, as published in ISO documents having reference numbers ISO 7811/2-1985(E) and ISO 7813-1985(E), respectively, and the issuer security key is encoded on the card at the location formerly used for clock bits, thereby enabling the key to be encoded without modification of existing data formats for data encoded on the financial transaction identification card.

3. The method of claim 1 wherein the transaction location is assigned a unique value, and the issuer security key is combined with the transaction location value and the resulting value is used as the encryption key to encrypt the preselected data at the transaction location and decrypt the preselected data at the remote location.

4. The method of claim 3 wherein the issuer security key is logically exclusive OR'd with the transaction location value.

5. A method of securing electronic data relating to a customer-initiated financial transaction or the like for transmission from a transaction location to a remote receiving location, comprising:
   issuing the customer a financial transaction identification card having an issuer security key encoded thereon, the issuer security key corresponding to the remote receiving location;
   storing the issuer security key at the remote receiving location;
   at the time of a financial transaction, reading the issuer security key at the transaction location from the financial transaction identification card;
   at the transaction location, encrypting preselected data relating to the financial transaction using an encryption algorithm and the issuer security key as the encryption key;
   transmitting data relating to the financial transaction, including the encrypted data, to the remote receiving location through one or more intermediate nodes; and
   decrypting the encrypted data at the remote location using the issuer security key stored at the remote location.

* * * * *